US011724755B2

United States Patent
Köster

(10) Patent No.: US 11,724,755 B2
(45) Date of Patent: Aug. 15, 2023

(54) DEVICE FOR TRANSFERRING A LINE BETWEEN A RETRACTED STATE AND AN EXTENDED STATE AND CORRESPONDING SYSTEM, CORRESPONDING USE AND CORRESPONDING METHOD

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

(*) Notice: Subject to any disclaimer, the term of this patent is extended or adjusted under 35 U.S.C. 154(b) by 506 days.

(21) Appl. No.: 16/959,523

(22) PCT Filed: Dec. 20, 2018

(86) PCT No.: PCT/EP2018/086303
§ 371 (c)(1),
(2) Date: Jul. 1, 2020

(87) PCT Pub. No.: WO2019/134848
PCT Pub. Date: Jul. 11, 2019

(65) Prior Publication Data
US 2021/0061377 A1 Mar. 4, 2021

(30) Foreign Application Priority Data
Jan. 2, 2018 (DE) .................. 10 2018 100 025.1

(51) Int. Cl.
*H02G 11/00* (2006.01)
*B62D 53/12* (2006.01)
(52) U.S. Cl.
CPC ........... *B62D 53/125* (2013.01); *H02G 11/00* (2013.01)

(58) Field of Classification Search
CPC .............................. B62D 53/125; H02G 11/00
USPC ......................................................... 280/421
See application file for complete search history.

(56) References Cited

U.S. PATENT DOCUMENTS

| 2,480,413 A | 8/1949 | Kirksey |
| 2,667,365 A | 1/1954 | Hollifield |
| 3,391,950 A | 7/1968 | Carter et al. |
| 3,479,055 A | 11/1969 | Cunha et al. |

(Continued)

FOREIGN PATENT DOCUMENTS

| DE | 4135795 A1 | 5/1993 |
| DE | 19840007 A1 | 3/2000 |

(Continued)

OTHER PUBLICATIONS

European Patent Office; International Search Report; dated Apr. 4, 2019.

*Primary Examiner* — Timothy J Thompson
*Assistant Examiner* — Michael F McAllister
(74) *Attorney, Agent, or Firm* — Price Heneveld LLP

(57) ABSTRACT

A device for transferring a line between a retracted state and an extended state includes a line arranged in an interface region between a semitrailer train and a semitrailer, wherein the line has a first line section and a second line section and wherein the line is longer in the extended state than in the retracted state, and an envelope element via which the first line section and the second line section are connectable for transfer between the retracted state and the extended state by forming a telescopic mechanism.

15 Claims, 2 Drawing Sheets

(56) References Cited

U.S. PATENT DOCUMENTS

| | | | |
|---|---|---|---|
| 3,653,686 A * | 4/1972 | Roesies | B62D 53/125 |
| | | | 280/421 |
| 8,505,949 B2 | 8/2013 | Temple et al. | |
| 2012/0153597 A1 * | 6/2012 | Glazner | B60D 1/64 |
| | | | 280/422 |

FOREIGN PATENT DOCUMENTS

| | | | | |
|---|---|---|---|---|
| DE | 10155056 A1 | 6/2003 | | |
| DE | 102008014572 A1 | 9/2009 | | |
| DE | 102015226094 A1 * | 6/2017 | | B60D 1/26 |
| EP | 0127146 A2 | 12/1984 | | |
| EP | 0539860 A1 | 5/1993 | | |
| WO | WO-9718099 A1 * | 5/1997 | | B60D 1/64 |

* cited by examiner

DEVICE FOR TRANSFERRING A LINE BETWEEN A RETRACTED STATE AND AN EXTENDED STATE AND CORRESPONDING SYSTEM, CORRESPONDING USE AND CORRESPONDING METHOD

BACKGROUND OF THE INVENTION

The present invention relates to a device for transferring a line between a retracted state and an extended state, a system for transferring a line between a retracted state and an extended state, a use of the device and a method for providing the device.

In the case of semitrailer trains and semitrailers known from the state of the art, the semitrailer is mechanically connected to a fifth-wheel coupling on the semitrailer train side by means of a kingpin. For a successful coupling, in particular a fully automatic coupling, it is also provided that semitrailer-side lines and semitrailer train-side lines or supply lines, such as air pressure lines or electrical lines, are connected to each other. In order to realize a coupling even with semitrailers and semitrailer trains that are aligned at an angle to each other, the state of the art also knows coupling components or outriggers that are mounted pivotably relative to the kingpin. Such coupling components or outriggers serve to guide or support the lines. Since the lines are carried along with these slewing movements, appropriate measures must be taken to change their length in order to avoid damage to the lines or not to restrict the freedom of movement of the slewing motion of the coupling component. From the state of the art, the use of a cable drum on which a part of the line is wound up in order to cause specific changes in length that are coordinated with the swivel motion of the coupling component is known.

Based on this background, the present invention makes it its object to provide an alternative or improved device with which a change in length of lines in the interface region between a semitrailer train and a semitrailer can be specifically adjusted.

SUMMARY OF THE INVENTION

In accordance with the invention, a device is provided for transferring a line between a retracted state and an extended state, wherein the line is arranged in an interface region between a semitrailer train and a semitrailer, wherein the line has a first line section and a second line section and wherein the line is longer in the extended state than in the retracted state, wherein the device comprises an envelope element via which the first line section and the second line section are connectable or connected by forming a telescopic mechanism, in particular are permanently connected to one another as individual components. Compared to the state of the art, the telescope-like coupling between the first line section and the second line section according to the invention proves to be advantageous in that there is no need for a space-filling construction for winding up the cables. The envelope element can be part of the second line section or rigidly connected to it. In particular, it is intended that the transition between an extended state and a retracted state takes place by means of a translational offset, preferably a rectilinear translational offset, due to the telescopic coupling. The translational offset is preferably caused between the first line section and the envelope element. It is conceivable here that the first line section is fixed or secured in position and the envelope element is mounted on the first line section so that it can be displaced longitudinally, i.e. along a direction determined by its longitudinal axis. The lines are preferably supply lines, such as an air pressure line and/or an electrical line. In principle, the interface region is understood to be a region that includes all components that contribute to coupling a semitrailer to semitrailer train. In particular, it is a region that is less than 2 m away from the kingpin. Preferably, when mounted, the device is part of the semitrailer or mounted on a lower side of the semitrailer. Preferably, it is intended that the envelope element has a cylindrical, in particular tube-shaped, base body. Furthermore, it is provided that a longitudinal axis of the envelope element runs parallel to the direction of translation, along which the first and second line sections, which are telescopically connected to each other, are pushed in and out. Furthermore, it is provided that a maximum length change is determined by a longitudinal extension of the envelope element. In particular, it is provided that the device for transferring the line between the retracted state and the extended state is coupled, i.e. operatively connected, with a pivoting movement of a coupling component or an outrigger. It is provided that when the coupling component is pivoted from a central position in which the coupling component is aligned substantially parallel to an imaginary central axis along the semitrailer, a transfer from the retracted state to the extended state takes place.

In this context, the first line section and the second line section are to be understood as independent components that can be displaced or shifted relative to one another. In particular, the first and the second line section form a composite line and the entire device with its line connects directly or indirectly to a coupling or a plug in the interface region. Preferably, the device does not form part of a connector, i.e. no connection is made via the device itself. Instead, with the device, the line can be kept under tension on one side of the interface region. Preferably, the first and second sections of the line are permanently connected to each other, even if they are movable relative to each other, so that they can be transferred between a retracted and an extended state. Preferably, there is a permanent contact between the first and the second line section, even if they are two components that can be moved relative to each other.

Furthermore, it is provided that the first line section and/or the second line section runs at least partially, in particular completely, through the envelope element or within the envelope element. Accordingly, it is provided in particular that the envelope element provides a channel or a cable duct for the line. For example, the envelope element is not part of the second line section.

Furthermore, it is preferable to have the first line section and/or the second line section or the envelope element aligned substantially parallel to the longitudinal axis of the vehicle, in particular in a non-pivoted state. It is also provided that for coupling the line, the line is mounted so that it can be displaced in a direction parallel to the longitudinal axis of the vehicle by means of the telescopic mechanism. In particular, it is provided that no clewing motion of the lines for coupling is carried out with the telescopic mechanism, but that the telescopic mechanism is provided for the targeted length compensation of the lines, which takes place during a coupling.

Expediently, the envelope element is supported in a holding device so as to be translationally displaceable or relocatable. By mounting the envelope element in the holding device, the envelope element can be displaced during the transfer between the retracted and the extended state. For this purpose the holding device comprises a recess, in particular a round recess, through which the envelope element passes in the assembled state. Preferably, the recess is designed to fit (with play) the outer circumference of the shell element exactly. The recess is designed to be so wide, seen in the translational direction along which the envelope element can be displaced, that the envelope element is aligned and held in the holding device. This means that the recess determines the translational direction along which the envelope element is displaced during operation.

Preferably the envelope element is connected to the holding device via a spring element, the spring element being pretensioned in an extended state of the line. It is advantageous for the envelope element to be automatically returned to the retracted state by the pretension. Due to the active connection to the coupling component, it is advantageous for the coupling component to return to its central position, preferably automatically. For example, the spring element is designed as a spiral spring that is wound around the outer circumference of the envelope element. This means that the envelope element supports and stabilizes the alignment of the spring element with advantage. Furthermore, it is intended that the spring element is supported with its one end on the holding device, in particular in an area of the holding device directly adjacent to the recess. With the opposite other end, the spring element is supported by a collar protruding from the envelope element. The collar may be closed or interrupted and preferably projects vertically from the envelope element, in particular its outer circumference. Furthermore, it is conceivable that a groove or slot is provided on the retaining device and/or on the collar, in which the spring element engages with its ends in the assembled state. In this way, the spring element can be secured against accidental slipping in a radial direction.

It is expedient that the envelope element is connected via a cable element to a pivotally mounted coupling component, in particular an outrigger. In this way, the device can be transferred from a retracted state to an extended state in synchronization with a slewing motion of the coupling component. Preferably, the cable element is separate from the lines so that the device can be transferred from a retracted state to an extended state without a tensile force having to act on the device via the line, in particular via the second line section. For this purpose, it is conceivable, for example, that the cable is connected to the envelope element and is preferably aligned parallel to the translational direction of the envelope element, at least in some areas. Preferably, the cable between the envelope element and the coupling component is under tension in the retracted state of the line, while the second line section is slightly sagging in the retracted state, i.e. is not under tension. This allows a transition from the retracted state to the extended state to begin before the second cable section is put under tension. This additionally protects the line.

Preferably the cable element comprises a steel wire as the central fibre. This further improves the resilience of the cable element.

The envelope element is connected to the coupling component in such a way that when the coupling component is pivoted, the first line section and the second line section are displaced translationally relative to each other. In particular, it is intended that the offset of the envelope element is coordinated with the slewing motion of the coupling component. This means that the further the coupling component is pivoted, the further the envelope element is displaced in relation to the holding device. It is preferably intended that at a maximum deflection of the coupling component, the envelope element has not yet or has just covered its maximum possible translation distance.

Preferably, it is intended that a first line section is fixed by means of a further holding device, in particular is fixed relative to the holding device. Accordingly, the envelope element, which surrounds one end of the first line section in a tube-like manner, is displaced relative to the first line section, which is fixed in a fixed position. By means of the further holding device, it is advantageous to align the first line section so that its end engages in the envelope element. It is provided that a ratio between a longitudinal extension of the envelope element and a distance between the holding device and the further holding device assumes a value between 0.6 and 0.9, preferably between 0.65 and 0.85 and particularly preferably between 0.68 and 0.78. It has turned out that at ratios between 0.68 and 0.78 the further holding device is arranged in such a way that there is a sufficient distance between the envelope element and the further holding device and at the same time a compact device is provided for transferring the line between the retracted and the extended state.

Preferably the line is a gas pressure line, the first line section being guided in a gas-tight manner in the envelope element. In particular, the first line section is designed or dimensioned coaxially at its end engaging in the envelope element in such a way that the line is sealed, in particular in the area of the device, by the first line section bearing against an inner side of the envelope element. It is also conceivable that the first line section is braced with its end engaging in the envelope element against the inside of the envelope element in order to ensure sealing.

For example, the line is an electrical line. In this case, it is advantageous that the electrical contact between the first line section and the second line section is maintained during the transfer between the retracted and extended states. This has the advantage of preventing the electrical contact between the semitrailer train and the semitrailer from being interrupted in the event of a clewing motion of the coupling component.

In particular, a connector bushing element is provided for maintaining electrical contact, the conductive envelope element being in electrical contact with an electrically conductive part of the first line section in both a retracted state and in an extended state. In particular, it is provided that an electrical contact is provided along circumferential inner and outer surfaces of the bushing element and the electrically conductive part of the first line section. When transferring between the retracted and extended states, the bushing element is displaced relative to the electrically conductive part of the first line section without the electrical contact being interrupted.

It is expedient for a device to comprise a plurality of envelope elements connected to each another, preferably each provided for a single line. For example, the several envelope elements are connected to each other via a common carrier. This allows several lines to be bundled in one device and changed synchronously and to the same extent in their length. For maintenance and repair work, it has also proven to be advantageous if one envelope element is provided for each individual line. This advantageously simplifies the replacement of lines that are maintenance-prone or in need of repair.

A further object of the present invention is a use of a device for transferring a line with having a first line section and a second line section between a retracted state and an extended state, wherein an envelope element is used for the transfer, via which the first line section and the second line section are telescopically connected to each another. All features described for the device according to the invention and its advantages can also be analogously transferred to the use according to the invention and vice versa.

A further object of the present invention is a system for transferring a line with a first line section and a second line section between a retracted state and an extended state, wherein the system comprises an envelope element via which the first line section and the second line section are telescopically connected to one another. All features described for the device according to the invention and the advantages thereof can also be analogously transferred to the system according to the invention and vice versa.

A further object of the present invention is a method for providing a device for transferring a line having a first line section and a second line section between a retracted state and an extended state, the device comprising an envelope element to which the first line section and the second line section are connected for telescopically supporting them. All features described for the device according to the invention and its advantages can also be transferred analogously to the method according to the invention and vice versa.

BRIEF DESCRIPTION OF THE DRAWINGS

Further advantages and features result from the following description of preferred embodiments of the subject of the invention with reference to the attached figures. Individual features of the individual embodiments can be combined within the scope of the invention. It is shown in FIG. 1a is a cross-sectional top plan view of a device for extending a line in the interface region between a semitrailer train and a semitrailer according to a preferred embodiment of the present invention.

DETAILED DESCRIPTION

Figure 1:
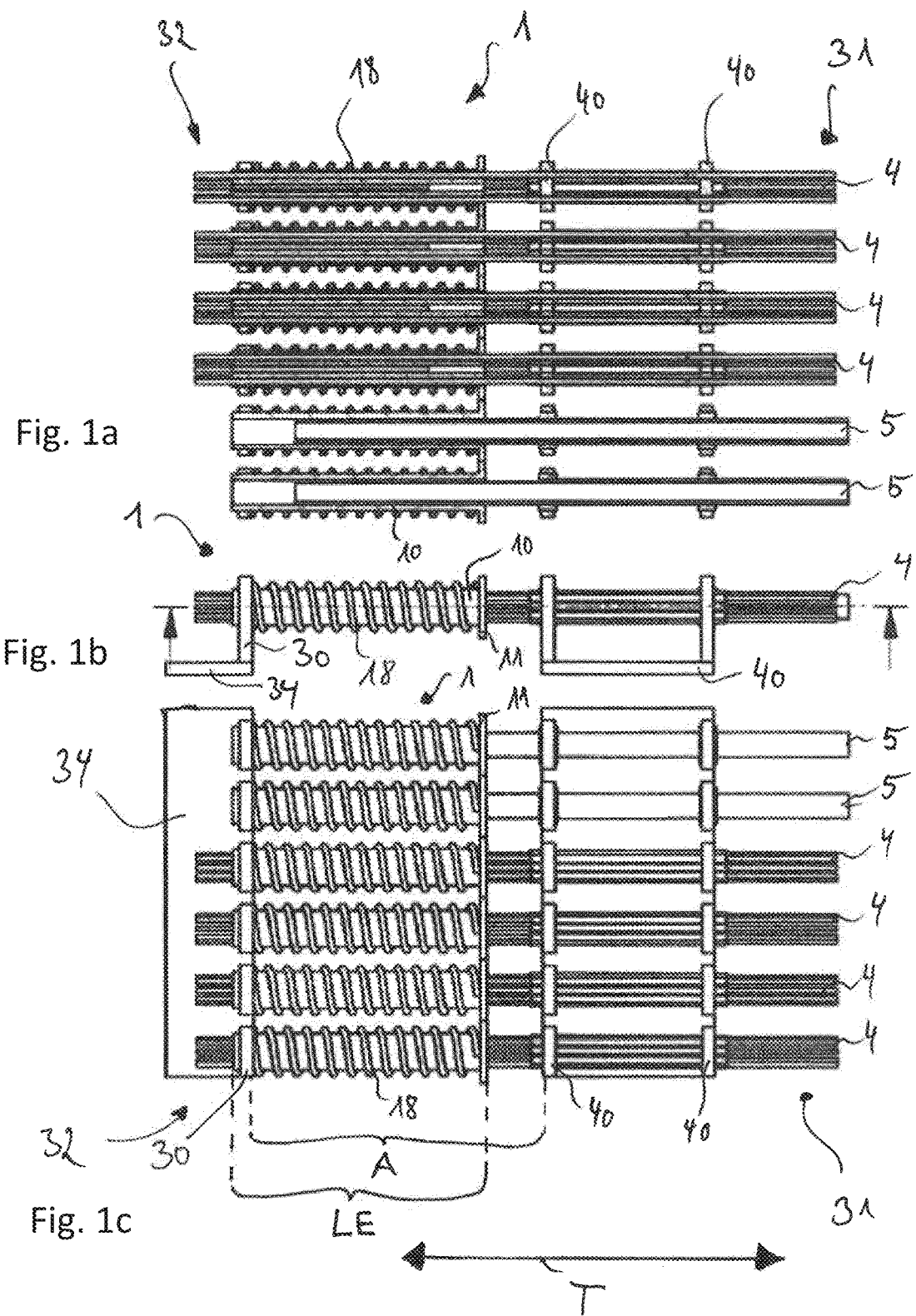
FIG. 1b is a side elevation view of the device.
FIG. 1c is a top plan view of the device.

In FIGS. 1a-1c, a device 1 for extending a line in the interface region between a semitrailer train and a semitrailer according to a preferred embodiment of the present invention is shown in a sectional view (top), a side view (middle) and a top view (bottom). An interface region between the articulated vehicle and the semitrailer is understood in particular to be the region in which the semitrailer is tied to the semitrailer train, preferably tied automatically. For example, the semi-trailer is connected to the semitrailer train via a kingpin on the trailer side, which engages in a fifth wheel coupling on the semitrailer train side. In addition to the mechanical coupling, it is also necessary that trailer-side and semitrailer train-side lines or supply lines, such as a gas pressure line 5 or air pressure line or an electrical line 4, can be connected to each other via a corresponding plug or connection mechanism in the interface region. It is provided on the trailer side that a coupling component or a outrigger is pivotably mounted, in particular pivotably mounted to the kingpin. The coupling component serves to guide the lines. For this purpose, the lines are connected to the coupling component on the inside or outside. Due to the slewing motion it is necessary that the cables do not restrict the freedom of movement of the coupling component or are not permanently damaged by the slewing motion.

To avoid such a restriction of the freedom of movement of the coupling component, a device 1 for extending a line is preferably provided. The line comprises a first line section 31 and a second line section 32, which are telescopically connected to each other via an envelope element 10. Here, for example, the envelope element 10 can be part of the second line section 32 or be connected to the second line section 32 in a non-positive, positive and/or material-locking manner. Preferably, the first cable section 31 is translationally mounted in the envelope element 10 for transferring the line between a retracted state and an extended state, whereby a length of the line in the extended state is greater than a length in a retracted state. By means of the telescopically acting envelope element 10, the line can be transferred, in particular reversibly, between the retracted state and the extended state.

In the embodiment shown in FIGS. 1a-1c, a large number of envelope elements 10 are provided, each of which is intended to extend a single line. The system illustrated here comprises four electrical lines 4 and two air pressure lines 5. Preferably, the envelope elements 10 are connected to each other, in particular by means of a collar 11 running along the front of the envelope element. Preferably, the envelope element 10 is designed in the form of a tube, and the collar 11 is directed radially outwards, for example. Furthermore, it is provided that the device 1 comprises a holding device 30 and a further holding device 40, whereby the holding device 30 is arranged in a fixed position relative to the further holding device 40. In the embodiment shown, the further holding device 40 is provided for fixing the first pipe section 41 and the holding device 30 for supporting the envelope element(s) 10. If several lines are provided, several holding devices 30 are combined in one carrier 34. It is provided that a ratio between a longitudinal extension LE of the envelope element 10 and a distance A between the holding device 30 and the further holding device 40 assumes a value between 0.6 and 0.9, preferably between 0.65 and 0.85 and particularly preferably between 0.68 and 0.78. In particular, it is provided that the envelope element(s) 10 are mounted in the holding device 30 so as to be translatable or longitudinally displaceable. For example, the holding device 30 comprises a recess whose cross-section is adapted to the outer surface of the envelope element 10 so that the envelope element 10 can be displaced in the recess along its longitudinal extension.

Furthermore, it is intended that the envelope element 10 is connected to the holding device 30 via a spring element 18. In particular, the envelope element 3 is supported by the holding device 30 via the spring element 18. Here, the spring element 18 rests with its one end, for example, on the retaining device 30 and with an opposite end on the collar 11 of the envelope element 10. Preferably, the spring element 18 is a spiral spring which is wound around the sleeve element 10 in the assembled state. In particular, it is intended that the envelope element 10 is operatively connected to the coupling component. Preferably, the envelope element 10 is connected to the coupling component via a cable element in such a way that when the coupling component is swivelled, the cable element pulls on the envelope element 10, thus causing an extension of the line. In doing so, the envelope element 10 is moved away from the further holding device 40. At the same time, the spring element 18 is pretensioned. By means of this pretensioning, it is advantageously possible to transfer coupling component 1 to an initial position at the end of the clewing motion, in which the spring element 18 is no longer pretensioned and the line is in the retracted state.

To ensure that the lines can maintain their functionality in both the extended and retracted state, the gas pressure lines 5 are designed to be inserted into each other gas-tight. For this purpose, the first line section 31 is formed coaxially to the inside of the envelope element 1 at least at its end which engages in the envelope element 1 in the assembled state.

Figure 2:
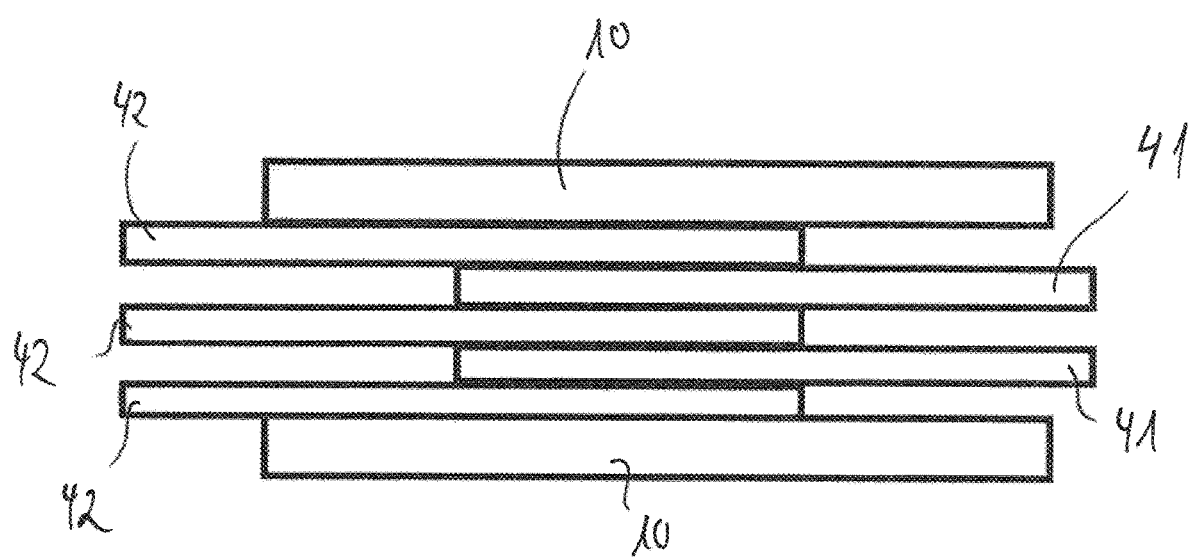
FIG. 2 is a schematic view of the device.

FIG. 2 shows a detailed view of the device from FIG. 1, in particular in the area for the electrical line 4, where it is intended that the first line section 31 and the second line section 32 are in electrical contact via one or more connector bushing elements 41. In this case, the conductive parts 42 of the first line section 31 are in contact with connector bushing elements 41 of the second line section 32 and are moved along an inner surface of the bushing element 41 during the transfer between the retracted state and the extended state without breaking contact with this inner surface.

LIST OF REFERENCE SIGNS

1 device
4 electric line
5 gas pressure line
10 envelope element
11 collar
18 spring element
30 holding device
31 first line section
32 second line section
34 carrier
40 further holding device
41 connector bushing element
42 electrically conductive part
LE longitudinal extension
A distance

The invention claimed is:

1. A device for transferring a line between a retracted state and an extended state, comprising:
   a line arranged in an interface region between a semi-trailer train and a semitrailer, wherein the line has a first line section and a second line section and wherein the line is longer in the extended state than in the retracted state; and
   an envelope element via which the first line section and the second line section are connectable for transfer between the retracted state and the extended state by forming a telescopic mechanism;
   wherein the line comprises a gas pressure line where the first line section is guided in a gas-tight manner in the envelope element, and/or comprises an electrical line where a connector bushing element is in and maintains electrical contact with an electrically conductive part of the first line section in both a retracted state and an extended state.

2. The device according to claim 1, wherein the envelope element is supported in a holding device so as to be translationally displaceable.

3. The device according to claim 2, wherein the envelope element is connected to the holding device via a spring element, and wherein the spring element is pretensioned in the extended state of the line.

4. The device according to claim 3, wherein the envelope element is connected via a cable element to a pivotally mounted coupling component.

5. The device according to claim 4, wherein the coupling component includes an outrigger.

6. The device according to claim 4, wherein the cable element comprises a steel wire as a central fibre.

7. The device according to claim 4, wherein the envelope element is connected to the coupling component such that when the coupling component is pivoted, the first line section and the second line section are displaced translationally relative to one another.

8. The device according to claim 2, wherein the first line section is fixed by a holding device and is fixed relative to the holding device.

9. The device according to claim 4, the envelope element is one of a plurality of envelope elements each provided for a single line and connected to each other.

10. The device according to claim 1, wherein the envelope element is connected via a cable element to a pivotally mounted coupling component.

11. The device according to claim 10, wherein the coupling component includes an outrigger.

12. The device according to claim 10, wherein the cable element comprises a steel wire as a central fibre.

13. The device according to claim 10, wherein the envelope element is connected to the coupling component such that when the coupling component is pivoted, the first line section and the second line section are displaced translationally relative to one another.

14. The device according to claim 10, the envelope element is one of a plurality of envelope elements each provided for a single line and connected to each other.

15. A method for transferring the line between the retracted state and the extended state, that includes providing the device according to claim 1, and further including transferring the line between the retracted and extended states via the envelope element such that the first and second line sections are telescoped with respect to one another.

* * * * *

UNITED STATES PATENT AND TRADEMARK OFFICE
CERTIFICATE OF CORRECTION

PATENT NO. : 11,724,755 B2
APPLICATION NO. : 16/959523
DATED : August 15, 2023
INVENTOR(S) : Köster It is certified that error appears in the above-identified patent and that said Letters Patent is hereby corrected as shown below:

In the Specification

Column 5, Line 47:
"semi-trailer" should be – semitrailer –

Column 5, Line 55:
"a" (2nd occurrence) should be – an –

Column 6, Line 44:
"3" should be – 10 –

Column 6, Line 49:
"sleeve" should be – envelope –

Column 7, Lines 1, 2:
"1" should be – 10 –

In the Claims

Column 8, Claim 9, Line 24:
After "4," insert -- wherein --

Column 8, Claim 14, Line 39:
After "10," insert -- wherein --

Signed and Sealed this
Nineteenth Day of November, 2024

Katherine Kelly Vidal
*Director of the United States Patent and Trademark Office*